Figure 1:
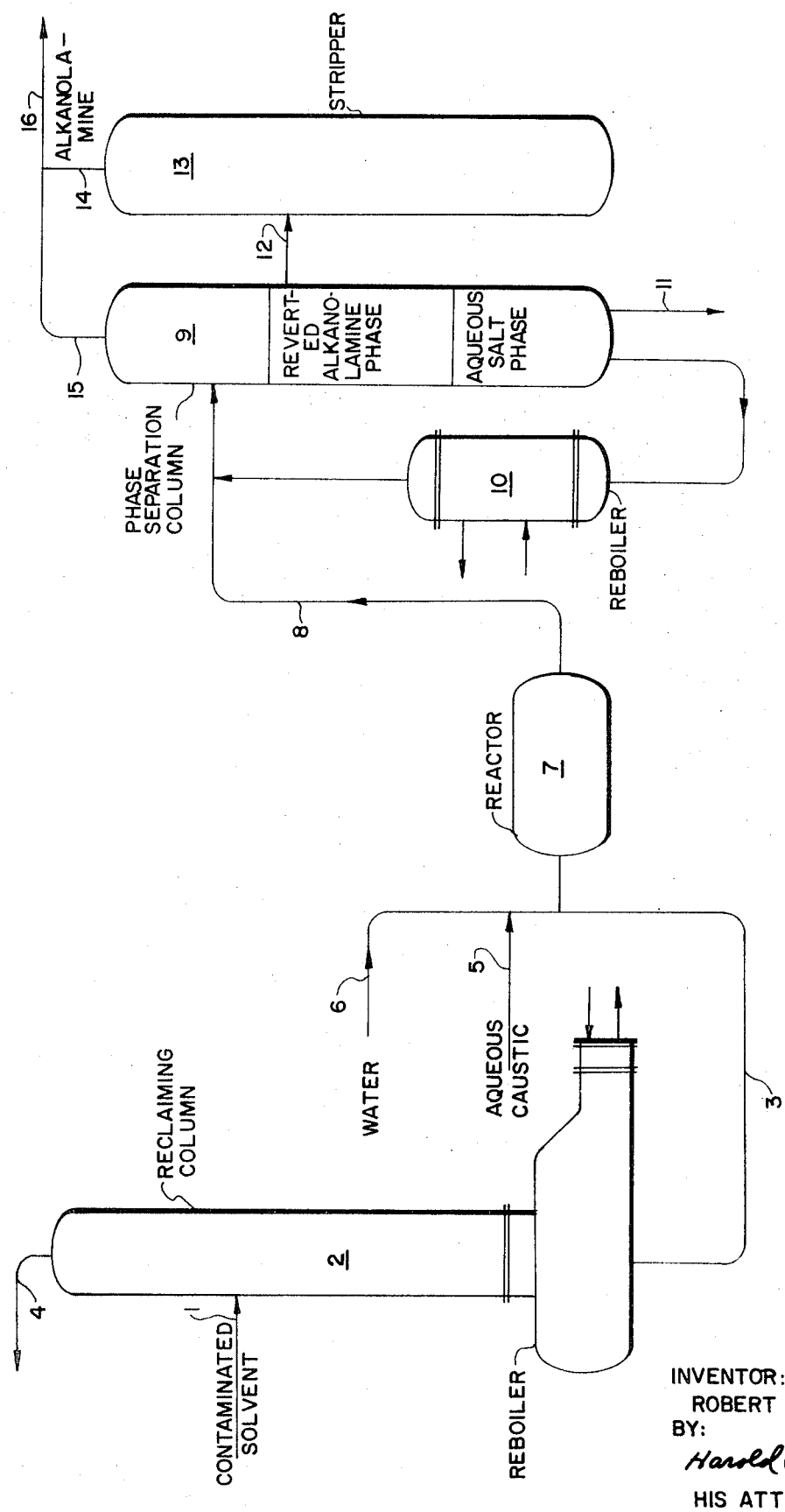

United States Patent

Van Scoy

[15] 3,658,462
[45] Apr. 25, 1972

[54] LIQUID-GAS ABSORPTION PROCESS

[72] Inventor: Robert W. Van Scoy, Walnut Creek, Calif.

[73] Assignee: Shell Oil Company, New York, N.Y.

[22] Filed: Mar. 5, 1970

[21] Appl. No.: 16,800

[52] U.S. Cl. .................................................................23/2 A
[51] Int. Cl. ..............................................................B01d 53/34
[58] Field of Search .................23/2, 2 A, 3, 3 LA; 260/584 R

[56] References Cited

UNITED STATES PATENTS 2,785,045  3/1957  Shen Wu Wah et al. .......................23/2
2,701,750  2/1955  Paulsen et al. ..................................23/2
3,535,260  10/1970  Singh ........................................23/2 A X Primary Examiner—Earl C. Thomas
Attorney—Harold L. Denkler and Glen R. Grunewald

[57] ABSTRACT

Stable alkanolamine-acid gas reaction products formed during the absorption of acidic gases from gas mixtures by means of an alkanolamine-containing absorbent liquid are reverted to free alkanolamines by treatment with caustic and water. The alkanolamines thus formed are recovered from a two phase system and reused in the absorption process.

6 Claims, 2 Drawing Figures

INVENTOR:
ROBERT W. VAN SCOY
BY:
Harold L. Slinkler
HIS ATTORNEY

INVENTOR:
ROBERT W. VAN SCOY
BY:
*Harold L. Denkler*
HIS ATTORNEY

LIQUID-GAS ABSORPTION PROCESS

This invention relates to an improved gas purification process. More particularly, it relates to an alkanolamine-gas absorption process wherein stable reaction products are removed from the absorbent steam by reversion to free alkanolamines which are recovered and reused in the process.

A number of methods are known to the art for the purification of mixtures of gases contaminated with acidic components such as hydrogen sulfide, carbonyl sulfide, carbon dioxide and the like. Among the most widely used processes are those employing alkanolamine absorbents which form salts with acidic components in gas mixtures. These salts are subsequently decomposed to drive off the absorbed gas thereby regenerating the absorbent liquid. Unfortunately, not all of the reaction products of alkanolamines and acidic gases are regenerative, and as a result, there is usually an accumulation of rather stable contaminants in the absorbent stream. The formation of such compounds deleteriously affects the efficiency of the process and necessitates purification of the circulating absorbent liquid or its periodic replacement.

The problem of accumulation of stable reaction products is particularly acute in processes wherein the gas mixtures treated contain appreciable amounts of carbon dioxide because a portion of the $CO_2$ reacts with alkanolamines to form stable oxazolidone compounds, i.e., compounds having the general formula:

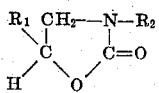

wherein the $R_1$ and $R_2$ substituents are derived from the alkanolamine reactant. For example, in processes wherein diisopropanolamine is employed in the absorbent liquid, a diisopropanolamine-carbon dioxide reaction product (DIPA-oxazolidone) is formed having the formula:

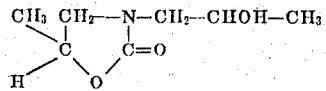

Because of steady production of these oxazolidones, it is not uncommon to have an accumulation of up to 15 percent or more of these relatively stable compounds in the circulating absorbent stream. The formation of such large concentrations of oxazolidones not only depletes the amount of alkanolamine available for absorption of additional quantities of acidic gases, but further impairs the the effectiveness of the process because of the tendency of oxazolidones to substantially increase the viscosity of the absorbent liquid. Because of the adverse effect of oxazolidones on the properties of the absorbent liquid, it is generally necessary to either partially replace the circulating solvent or to purify it as the concentration of oxazolidones increases. Purification or reclaiming is generally accomplished in a separate column equipped with a reboiler, wherein the solvent is volatized and recovered overhead, while the higher boiling contaminants are drawn off as bottoms product and discarded. Since both the replacement of the absorbent liquid and the discarding of contaminants involve a substantial loss of solvent, neither of these alternatives is attractive to users of such processes.

To overcome this problem, a number of methods of treating contaminated alkanolamine solvents have been proposed, including processes wherein the absorbent liquid is treated with caustic to revert the stable alkanolamine-acid gas reaction products to free alkanolamines. By and large, however, these procedures have not yielded satisfactory results. Processes employing caustic treating, for example, produce as a by-product relatively large quantities of salt which deposit in reactors and other vital parts of the system necessitating frequent shutdowns for cleaning. In order to achieve some semblance of a continuous operation, it is generally necessary to employ a plurality of reactors in order that treating can be conducted in one or more of the reactors, while the others are being washed to remove the salt deposits. Because of the problems associated with such systems and the high cost of installation and maintenance, most small scale users of absorbent gas purification processes and many intermediate or large scale users have not adopted the aforementioned procedures, and continue to periodically replace the absorbent solvent or reclaim the solvent by separating out and discarding the contaminating compounds.

Thus, it is apparent that a technically feasible and economically attractive method of regenerating stable alkanolamine-acid gas reaction products, which does not result in the problems encountered with prior art methods, would be of considerable benefit to the industry. The present invention provides such a process.

It has now been found that the stable compounds formed by the reaction of an alkanolamine absorbent with acidic constituents in a gas purification process can be effectively regenerated by (a) contacting said absorbent liquid or a concentrate of the stable compounds contained therein with caustic and water, (b) separating the reaction mixture into two separate liquid phases, i.e., a reverted alkanolamine phase and an aqueous salt phase, and (c) withdrawing the alkanolamine phase thus formed and reusing the same in the absorption process.

By the term "gas purification process" as hereinbefore used is meant any process for the separation of acidic gases from gas mixtures wherein an alkanolamine liquid absorbent is employed either alone or in conjunction with other solvents, and/or in conjunction with water. Alkanolamines commonly employed in such processes include, for example, $C_{1-4}$ mono- or di-alkanolamines such as monoethanolamine, diethanolamine, diisopropanolamine and the like. Solvents which are frequently employed in conjunction with alkanolamines, or in conjunction with alkanolamines and water, include ethylene glycols such as di- or tri-ethylene glycols; cyclotetramethylene sulfones such as thiophene tetrahydro-1,1-dioxide (sulfolane), 2-sulfolene and the like. The present invention is particularly advantageous for use in conjunction with gas purification processes wherein diisopropanolamine is used in combination with sulfolane as the absorbent liquid. A specific example of such a process is described in U.S. Pat. No. 3,347,621.

The principle advantage of the present invention is that it provides a method of reverting stable alkanolamine-acid gas reaction products to free alkanolamines in high yields without the formation of large deposits of salt. This is accomplished through the separation of the reaction mixture into two separate liquid phases to effect the recovery of the reverted alkanolamines. The separation into two phases provides additional benefits in that utilities requirements are considerably reduced since the reverted alkanolamines are separated prior to volatilization. A further advantage is that the waste stream is a single liquid phase aqueous salt solution which can be easily disposed of. Still other advantages of the invention are that solvent losses are minimized by use of the two phase recovery system, and that salt carryover into the absorbent stream is substantially avoided. Still further advantages of the invention are that it can be readily integrated into existing gas purification facilities, and that it can be economically employed in both large and small scale gas purification operations.

The invention and the advantages thereof will be more apparent from the detailed description below and the accompanying drawing which diagrammatically illustrates one embodiment of the invention. Apparatus not considered necessary to the understanding of the present invention has been omitted.

Referring now to FIG. 1, absorbent solvent containing stable alkanolamine-acid gas reaction products is passed by means of line 1 to reclaiming column 2 fitted with a reboiler. In the reclaiming column, the contaminants are concentrated and are drawn off as bottoms product through line 3, while the vaporized absorbent liquid is recovered overhead and recycled to the gas absorption process via line 4.

The concentrate of contaminants is introduced in reactor 7 together with caustic and water via lines 5 and 6, respectively, wherein the contaminants are reverted to free alkanolamines with the concomitant formation of the metal salts of the acidic constituents (e.g. $Na_2CO_3$ is formed in the case of reverting oxazolidones with NaOH).

The reaction mixture in a substantially single phase is passed through line 8 into phase separation column 9 equipped with suitable phase separating internals not shown, wherein it is separated into a reverted alkanolamine and an aqueous salt phase by adjusting the concentration of water in the phase separation column by means of reboiler 10. The level of the aqueous salt phase is controlled by partial recirculation of the salt solution to the reboiler and by means of a suitable level control device which regulates the amount of salt solution drained from the column through line 11. The level of the reverted alkanolamine phase is maintained by withdrawal via line 12 to stripping column 13, wherein the alkanolamine phase is stripped with steam to remove traces of salt. The volatized product is recovered overhead by means of line 14. Any solvents used in conjunction with alkanolamine would likewise be volatilized in the stripping column and recovered overhead together with the reverted alkanolamine. The overhead stream from column 13 is combined with the overhead stream of phase separation column 9 (line 15) and is recycled to the gas purification process for further use via line 16.

The aforementioned description is intended only to be illustrative of one application of the present process and should not be construed to limit the scope or application of the concept of the invention. It would be obvious to one skilled in the art that various modifications could be made of the operation described above without affecting the invention.

For example, while the contaminants in the absorbent solvent in the above illustration were concentrated in reclaiming column 2 prior to reaction with the caustic solution and water, it is entirely possible to react the contaminant-containing absorbent liquid directly with caustic solution and water without prior concentration, e.g., by taking a bleed stream of the contaminated absorbent and contacting this stream directly with caustic solution and water in a reactor without the use of a reclaiming column. This modification would, however, require an increase in the size of the reactor and recovery system to achieve the same rate of reversion as with the embodiment illustrated.

Another obvious modification of the previously described embodiment would be to add just enough water to form a two phase liquid reaction mixture, thereby eliminating the need to later remove water in the phase separation column. It is preferred, however, to add an excess of water to form a single phase reaction mixture, and then subsequently remove the excess portion of water to achieve phase separation, because higher reversion yields are achieved in this manner since there is more intimate contact between the reactants thereby reducing the size requirements of the reactor and residence time. The water recovered overhead via line 15 can be combined with stream 14 and recycled to the absorption process as shown in the drawing, or could be recycled to reactor 7 for reuse in the reversion reaction.

Thus, while the amount of water introduced into the reactor may be such as to immediately produce a two phase reaction mixture, it is more advantageous to form a single phase reaction mixture by using an excess of water which is subsequently removed to achieve separation into the alkanolamine and aqueous salt phase.

It would also be apparent to one skilled in the art that means other than a reboiler can be employed to adjust the water concentration of the reactant mixture to bring about the separation into phases in column 9. Likewise, volatization and recovery of the reverted amine phase can be accomplished by means other than the preferred method of stream stripping, for example, by distillation or evaporation.

While water and caustic are shown in the accompanying drawing as being introduced into the reactor through separate lines, it is understood that the water can be added in the form of a dilute aqueous caustic solution rather than separately as shown. Water used in the process can be obtained from any suitable source such as fresh water, fresh condensate, or condensate taken from any point in the absorption process. The use of condensate which is normally available at elevated temperatures would, of course, reduce utilities requirements. For example, condensate obtained from the regeneration column of a gas absorption process is very suitable for this purpose. Although such condensate might contain minor amounts of solvent, this would not significantly effect the rate of the reversion reaction.

For economic reasons, sodium hydroxide is the preferred caustic, however, other strong bases such as potassium hydroxide, lithium hydroxide and the like may also be used to effect the reversion reaction.

The invention will be further described by means of the following example which illustrates the composition and rates of flow of various streams in one specific application of the invention. The stream numbers employed below correspond to the streams illustrated in the drawing. Operating conditions are presented in Table I.

An absorption solvent comprising approximately 40%w diisopropanolamine, 40%w sulfolane and 15%w water and containing about 5%w DIPA oxazolidone (stream 1) is passed to reclaiming column 2 at the rate of 600 lbs/hr. Stream 3 comprising a concentrate of the oxazolidone contaminant is passed into reactor 7 at the rate of 25 lb/hr together with 48 Baume aqueous sodium hydroxide at the rate of 24 lb/hr and water condensate at the rate of 108 lb/hr. In the reactor approximately 99%w of the DIPA-oxazolidone is reverted to diisopropanolamine with the concomitant formation of $Na_2CO_3$ which remains in solution. The reaction mixture in a substantially single phase is passed to column 9 wherein separation into a diisopropanolamine phase and an aqueous $Na_2CO_3$ phase is effected by the removal of about 56 lb/hr water which passes overhead (stream 15) together with a minor amount (about 1lb/hr.) of diisopropanolamine.

Figure 2:
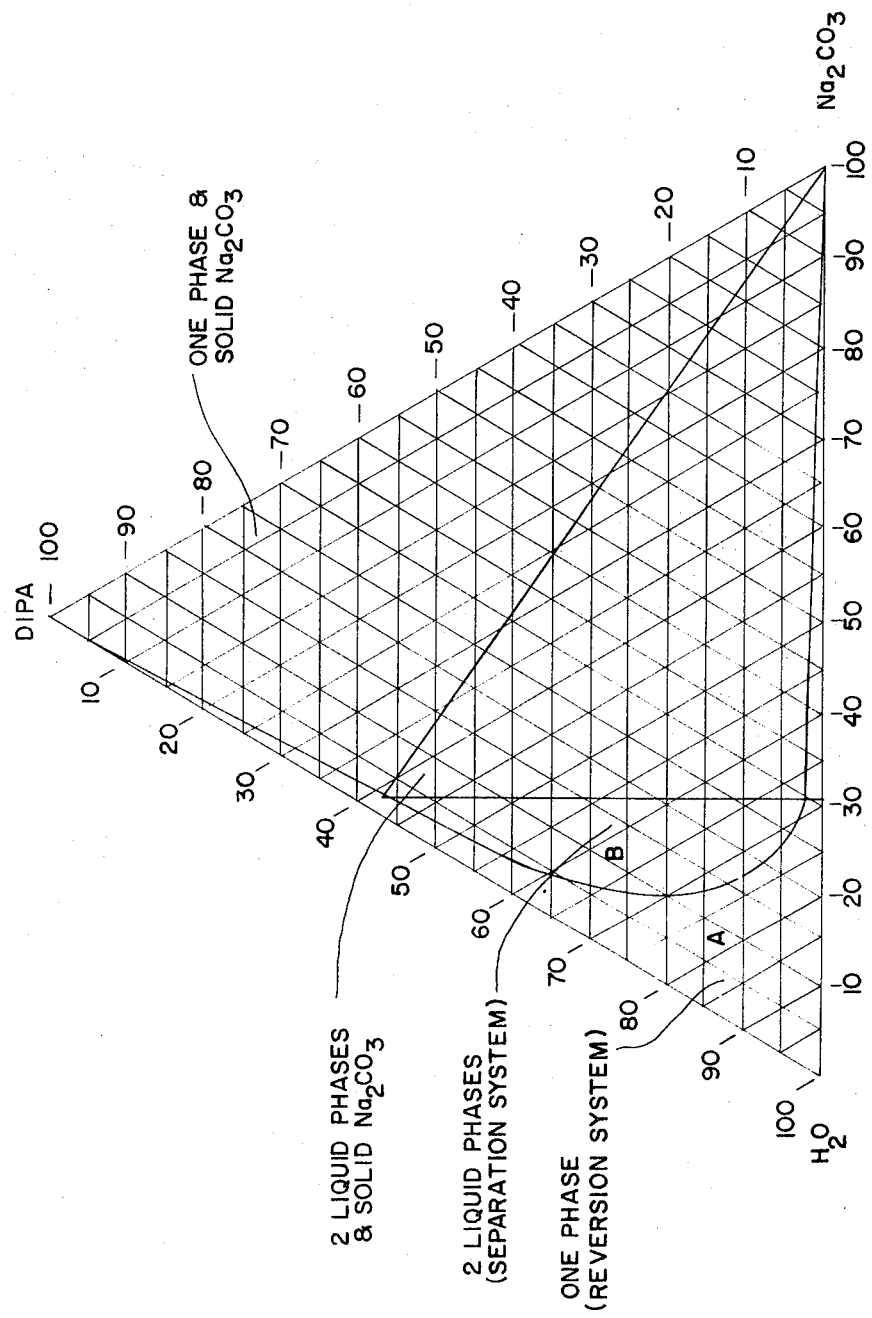

The amount of water initially added to the reaction mixture and the amount subsequently removed therefrom to obtain separation into two liquid phases can be readily determined by means of a three component phase diagram such as that illustrated in FIG. 2. Referring to this drawing which represents a weight percent phase diagram of the present water-diisopropanolamine-$Na_2CO_3$ system, it can be seen that in order to obtain a substantially single phase reaction mixture, it is necessary to adjust the concentrations of water and the reactants, so that they fall within area A shown in the phase diagram. The subsequent separation into an alkanolamine and an aqueous salt phase is accomplished by removing sufficient water to adjust the composition of the mixture so that it falls into area B wherein the mixture separates into two liquid phases. It is evident that if an excessive amount of water is removed, the saturation point of $Na_2CO_3$ in aqueous solution will be exceeded thus forming solid $Na_2CO_3$. This, of course, should be avoided since the presence of solid $Na_2CO_3$ in the system will negate the advantages of the present invention and result in the deposit build-up problems of prior art processes. Methods of preparing similar three-component phase diagrams for systems employing other alkanolamine solvents are known to the art and need not be discussed herein.

Continuing with the example, the diisopropanolamine phase is withdrawn to stripping column 13 wherein it is stripped with steam. About 19 lb/hr of diisopropanolamine is recovered as overhead product together with small amounts of water (stream 14). This stream is then combined with stream 15 which results in a total diisopropanolamine yield of 20 lb/hr which is recycled to the absorption process. The water present in this stream may be separated from the diisopropanolamine or recycled together with it to the absorption process, e.g., to the regeneration column.

TABLE I

Operating Conditions

| Reclaiming Column | Phase Separation Column |
|---|---|
| Top Temp., °F. 320 | Top Temp., 250° F. |
| Bottom Temp., °F. 380 | Pressure, psig 24 |
| | |
| Reactor | Stripper |
| Temp., °F. 300 | Top Temp., °F., 320°F. |
| Pressure, psig 160 | Steam Temp., 420°F. |

The operating conditions shown in Table I are particularly applicable to the treatment of diisopropanolamine-containing absorbent solvents. Operating conditions for treating other alkanolamine-containing solvents will vary somewhat, depending on their boiling points. Such modifications would be evident to those skilled in the art, and can be made or followed in the light of the foregoing disclosure.

I claim as my invention:

1. In a process for the absorption of acidic gases from a gaseous mixture employing an alkanolamine-containing absorbent liquid whereupon stable reaction products are formed, the improvement which comprises reverting said reaction products by (a) contacting at least part of said absorbent liquid with caustic and sufficient water to form a single liquid phase reaction mixture, (b) removing an amount of water from said reaction mixture sufficient to separate said reaction mixture into an alkanolamine liquid phase and an aqueous salt phase, (c) withdrawing said alkanolamine liquid phase and reusing the same in the absorption process.

2. The method of claim 1 wherein the stable reaction products are concentrated prior to contacting with caustic and water.

3. The method of claim 1 wherein the stable reaction compounds are predominantly oxazolidones.

4. The process of claim 1 wherein the withdrawn alkanolamine phase is steam stripped.

5. The method of claim 1 wherein the absorbent liquid consists essentially of diisopropanolamine, sulfolane and water.

6. The method of claim 4 wherein the stable reaction products are concentrated prior to contacting with caustic and water.

* * * * *